United States Patent [19]

Stewart et al.

[11] Patent Number: 4,536,121
[45] Date of Patent: Aug. 20, 1985

[54] DIVIDED ROTARY VALVE FEEDER

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 487,654

[22] Filed: Apr. 22, 1983

[51] Int. Cl.³ .............................................. B65G 53/40
[52] U.S. Cl. .................................... 414/219; 406/67; 406/123; 222/270; 222/636
[58] Field of Search ................ 414/189, 219, 220; 222/368, 636, 270, 328; 406/65–68, 63, 123; 239/655; 198/445, 446

[56] References Cited

U.S. PATENT DOCUMENTS

| | | | |
|---|---|---|---|
| 1,079,165 | 11/1913 | Conte | 198/446 |
| 1,752,549 | 4/1930 | Beardsley | 222/328 X |
| 2,333,790 | 11/1943 | Howard | 198/446 X |
| 2,490,056 | 12/1949 | Irmscher | 222/368 X |
| 2,538,944 | 1/1951 | Miller | 198/642 |
| 2,614,891 | 10/1952 | Colburn | 414/219 X |
| 2,766,911 | 10/1956 | Greaves et al. | 222/636 X |
| 2,941,650 | 6/1960 | Clinton | 198/446 X |
| 3,151,784 | 10/1964 | Tailor | 414/219 X |
| 3,167,191 | 1/1965 | Zellers, Jr. | 414/189 X |
| 3,178,165 | 4/1965 | Zimmermann | 266/182 |
| 3,237,540 | 3/1966 | Sühr | 222/270 X |
| 3,403,942 | 10/1968 | Farnworth | 406/65 |
| 3,446,404 | 5/1969 | Mehta | 222/368 X |
| 3,556,355 | 1/1971 | Ruiz | 414/219 X |
| 3,606,965 | 9/1971 | Cortelyou et al. | 222/368 X |

FOREIGN PATENT DOCUMENTS

| | | |
|---|---|---|
| 322488 | 12/1929 | United Kingdom . |
| 434408 | 8/1935 | United Kingdom . |
| 1572755 | 6/1980 | United Kingdom . |
| 2090215A | 7/1982 | United Kingdom . |

Primary Examiner—Joseph E. Valenza
Assistant Examiner—David A. Bucci
Attorney, Agent, or Firm—Marvin A. Naigur; John E. Wilson; John P. Shannon, Jr.

[57] ABSTRACT

A divided rotary valve feeder includes an inlet conduit, an outlet divided into a plurality of passages by webs, and rotor mounted between the inlet conduit and the outlet. The rotor includes vanes defining troughs and partitions dividing the troughs into a plurality of compartments. The partitions engage the webs to assure discharge of material from each compartment to an aligned passage, and the passages are in communication with conveyors for moving the material to a point of use. Tiltable splitter plates may be provided in the inlet conduit in engagement with the partitions to evenly distribute the flow of material to the compartments in each trough. Compressed air or other gas may be fed to each of the compartments to assist the discharge of material either by direct contact or by flexing a flexible boot in each compartment.

17 Claims, 4 Drawing Figures

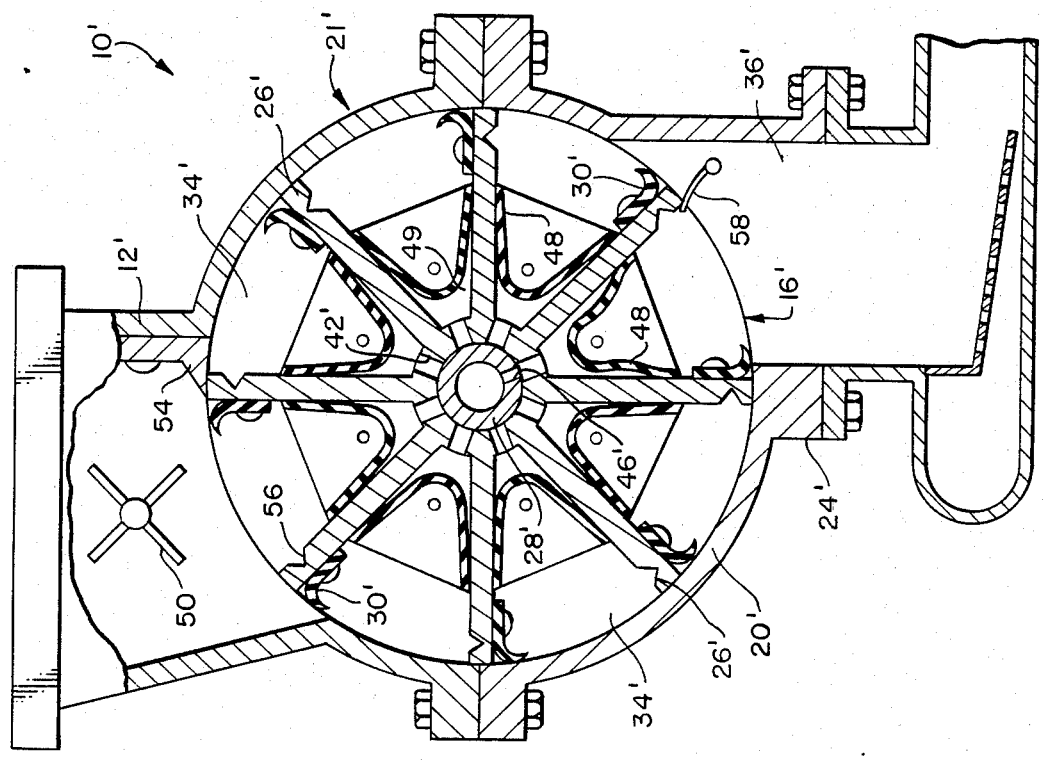
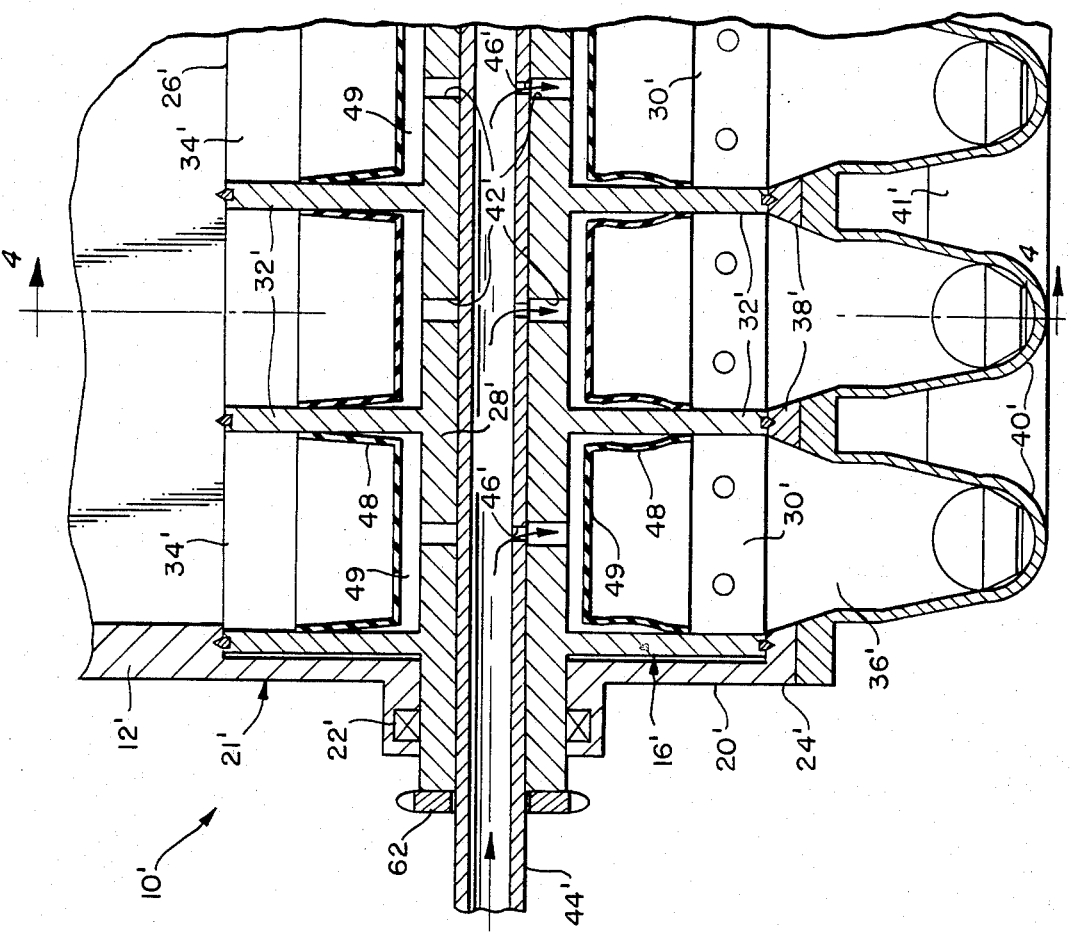

DIVIDED ROTARY VALVE FEEDER

DESCRIPTION

BACKGROUND OF THE INVENTION

Rotary valve feeders are commonly used to convey particulate material from a supply source to an area of use, especially where the area of use is pressurized and its atmosphere is at a higher pressure than the ambient pressure of the source. Among the most common applications for rotary valve feeders are those in combustion, gasification, and reaction processes utilizing a fluidized bed, in which a fluid, usually a gas, flows upward through a bed of suitably sized solid particles at a velocity sufficiently high to buoy the particles, to overcome the influence of gravity, and to impart to them an appearance of great turbulence, similar to that of a violently boiling liquid. In many cases, the particulate material must be injected into the base of the fluidized bed against a positive back pressure, thereby requiring the injection system to operate at a pressure above that of the supply of the particulate material, which is normally stored at atmospheric pressure.

It is desirable to feed the particulate material to the fluidized bed so that the material is distributed evenly throughout. However, the particulate material often includes a quantity of very fine solids or solids having a high drag-to-weight ratio. As a result, these solids tend to be stripped from the bed mixture under the action of the upwardly flowing fluidizing fluid. Material of this type tends to flow vertically upward, with poor horizontal diffusion and mixing, in concentrated wash zones occurring in vertical alignment with the points of injection of the solid material. Therefore, the particulate material must be fed to multiple points across the area of the fluidized bed in order to achieve even distribution. However, the various points in the fluidized bed tend to have different pressures, which causes air or other gas flows from one region to another. These gas flows present a further obstacle in evenly feeding the particulate material to the bed. Even in applications where the area of use is not pressurized, drafts and air currents are an obstacle to the even feeding of particulate material across the area.

SUMMARY OF THE INVENTION

It is, therefore, an object of the present invention to provide a system for feeding particulate material to a fluidized bed and for distributing the material evenly throughout the bed.

It is a more particular object of the present invention to provide a rotary valve feeder which is capable of distributing material evenly to a plurality of areas.

Toward the fulfillment of these and other objects, the present invention includes a divided rotary valve feeder having an inlet conduit in communication with a source of particulate material. The inlet conduit is part of a casing which also includes an outlet, and a cylindrical drum between the inlet conduit and the outlet. A rotor is mounted for rotation in the cylindrical drum, the rotor having radial vanes defining sector-shaped troughs for receiving the flow of particulate material from the inlet conduit, and upon rotation of the rotor, for transmitting the material to the outlet. In cases where there is no head of material in the inlet conduit, but instead a continuous flow of material through the inlet conduit, a plurality of adjustable splitter plates is provided in the inlet conduit to evenly divide the flow of material from the source into generally parallel channels and thereby evenly fill the sector-shaped troughs of the rotor. The troughs receive particulate material from the inlet conduit and deposit it in the outlet, which is divided by webs into a plurality of passages, each passage being in communication with one of a plurality of conveyors leading from the divided rotary valve feeder to various regions in the fluidized bed. The pressures in the various regions of the fluidized bed are usually different and are communicated with the outlet of the divided rotary valve feeder by the conveyors.

As a result of the pressure differentials, the material in the troughs of the rotor tends to be blown along the troughs toward one or a few passages in the outlet, so that some conveyors and, therefore, some regions of the fluidized bed receive more than their share of the particulate material, at the expense of other conveyors and regions. Therefore, the sector-shaped troughs are divided by transverse partitions into a plurality of compartments extending across the width of the rotor so that flow of gas and particulate material along the troughs is prevented. Each passage in the outlet is arranged to register with one of the compartments in each trough so that an equal charge of material is deposited in each passage. Where splitter plates are employed in the inlet conduit, each of the channels they define is aligned to register with one of the compartments in each trough and the splitter plates are adjusted so that equal charges of material are deposited in each compartment. Furthermore, the partitions engage the splitter plates and the webs to assure communication only between each compartment and its aligned channel of the inlet conduit and its aligned passage of the outlet. By this arrangement, the particulate material from the hopper is evenly distributed across the outlet and can be distributed evenly by the conveyors throughout the fluidized bed.

The rotor may be provided with a discharge assistant to positively remove the charges of particulate material from the various compartments, and to prevent caking therein, especially when the materials are moist. The discharge assistant can take the form of air or other gas under pressure acting directly on the material in the compartments or acting against a flexible boot lining the compartments to cause flexure of the boot, thereby resulting in positive displacement of the particulate material.

BRIEF DESCRIPTION OF THE DRAWINGS

FIG. 3 is a partial cross section of an alternate embodiment of the divided rotary valve feeder; and FIG. 4 is a cross section taken along the line 4—4 in FIG. 3.

DETAILED DESCRIPTION OF THE PREFERRED EMBODIMENT

Figure 1:
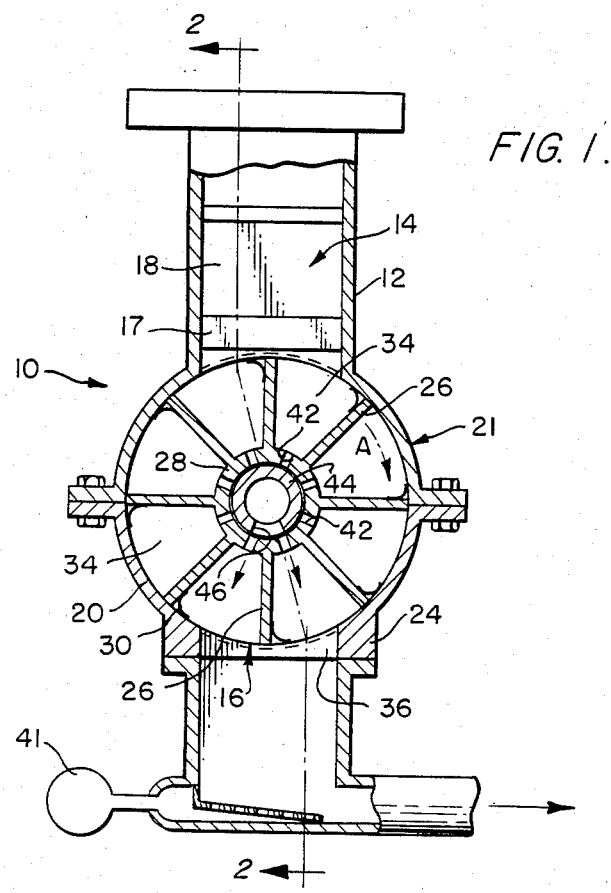
FIG. 1 is a cross-sectional view of the divided rotary valve feeder of the present invention.
Figure 2:
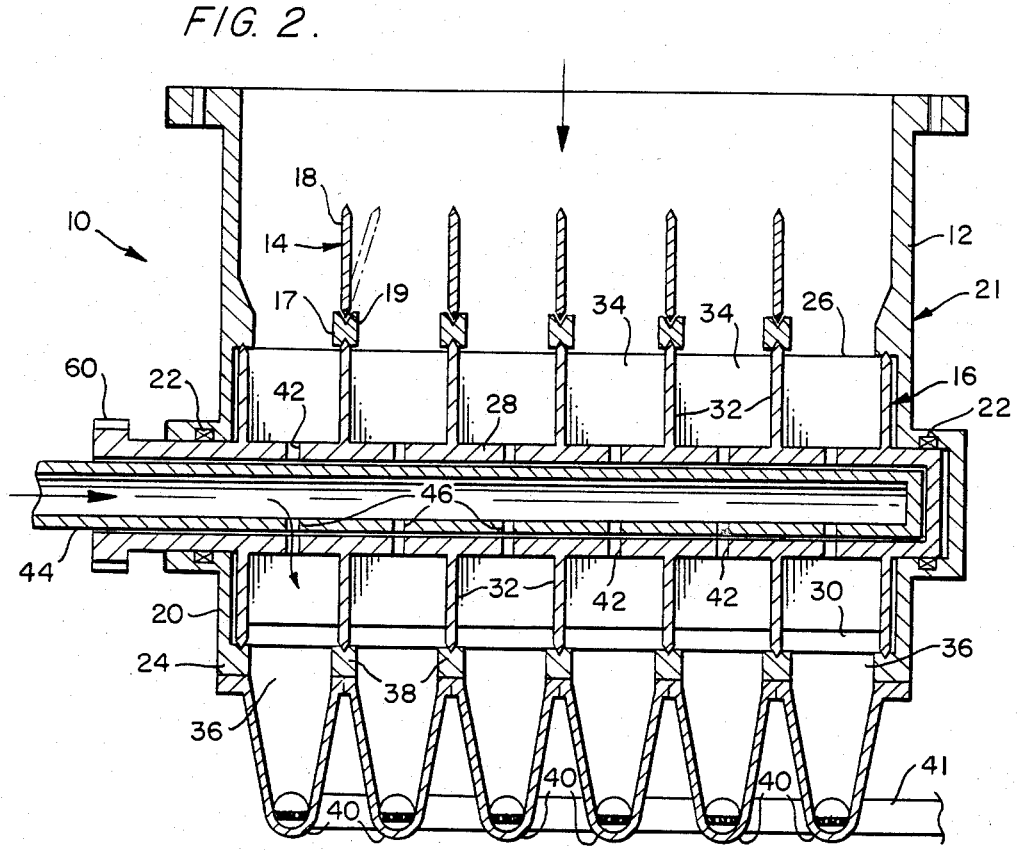
FIG. 2 is a cross section of the divided rotary valve feeder taken along the line 2—2 of FIG. 1.

As can be seen from FIGS. 1 and 2, the divided rotary valve feeder according to the present invention, which is designated generally by the reference numeral 10, includes an inlet conduit 12 which is in communication with a storage bin, hopper or other source of supply (not shown) of the particulate material. The flow of material to the inlet conduit 12 may be controlled by an external control system responsive to the level, weight or other characteristic of the material in the storage bin or elsewhere. A plurality of adjustable splitter plates 14 may be pivotally mounted in the inlet conduit 12 to divide the flow of particulate material from gthe source and guide it to a rotor 16. The splitter plates 14 are advantageous where there is a continuous flow of particulate material through the inlet conduit 12, and no head of particulate material builds up in the inlet conduit 12. The splitter plates 14, which are generally perpendicular to the axis of rotation of the rotor 16, may include mounting blocks 17 and tiltable plate elements 18 pivotally mounted on the mounting blocks 17, such as by pins 19. The splitter plates 14 thus define generally parallel channels in the inlet conduit 12 in communication with the rotor 16. The rotor 16 is mounted for rotation in a cylindrical drum 20 of a casing 21 by bearings 22, the casing 21 including the inlet conduit 12 and an outlet 24.

As can best be seen from FIG. 1, the rotor 16 includes a plurality of radially directed vanes 26 which engage the internal surface of the drum 20 and define a plurality of troughs. The rotor 16 also includes a hub 28 which is mounted for rotation within the bearings 22. During rotation, each of the troughs receives particulate material from the inlet conduit 12 and carries it to the outlet 24. The inlet conduit 12 is sealed from the outlet 24 by the vanes 26, which engage the internal surface of the drum 20. Additional sealing devices such as wipers 30 can be provided on the vanes 26 to provide a more positive seal. In addition to the vanes 26, the rotor 16 includes a plurality of transverse partitions 32 spaced along the axis of the rotor 16, thereby dividing the troughs into a plurality of compartments 34. Each of the compartments 34 is in alignment with a channel defined in the inlet conduit 12 by the splitter plates 14 when the trough defining the compartments 34 is in registration with the inlet conduit 12. As the given trough is rotated within the drum 20, the vane 26 following the trough in the direction of rotation seals the compartments 34 from the inlet conduit 12. As rotation continues, an additional vane 26 effects a seal between the subject compartments 34 and the inlet conduit 12. When there is at least a two-vane seal between the subject compartments 34 and the inlet conduit 12, the compartments 34 open into the outlet 24 and deposit their charges of material therein.

The oulet 24 is divided into a plurality of passages 36 by webs 38, each passage 36 registering with an annulus of compartments 34 and being separated from adjacent passages 36 and compartments 34 by the engagement of the transverse partitions 32 with the webs 38, which are positioned in the bottom of the outlet 24 in alignment with the transverse partitions 32 for separating the various passages 36. Each passage 36 is connected to a discharge pipe for gravity discharge or to another suitable conveyor, such as a fluid current conveyor 40, which moves the particulate material to a predetermined area, such as a particular area of a fluidized bed, so that the material is distributed evenly over the entire area. The conveyors 40 are in communication through a manifold pipe 41 with a source of compressed air or gas (not shown). Although the conveyors 40 illustrated are of the fluid current type, it is understood that other types of conveyors can be employed.

The hub 28 of the rotor 16 is hollow and includes a plurality of radial ports 42, each port 42 placing a compartment 34 in communication with the hollow center of the hub 28. A stationary gas supply pipe 44 is mounted in the hollow center of the hub 28 and is provided with a plurality of radial openings 46 directed toward the outlet 24. Each radial opening 46 is positioned to register with the radial ports 42 of an annulus of compartments 34 as the compartments register, in turn, with the outlet 24. The gas supply pipe 44 is in communication with a source of compressed air or other gas so that compressed gas flows through the gas supply pipe 44, the radial openings 46, the radial ports 42, the compartments 34 and the outlet 12 when the compartments 34 register with the outlet 12. In addition, because the transverse partitions 32 engage the webs 38 in the outlet 12, the contents of each compartment 34 of a given trough are discharged through a particular passage 36 to a particular conveyor 40.

In operation, as the rotor 16 rotates in the direction of the arrow A of FIG. 1, particulate material flowing through the inlet conduit 12 enters the compartments 34. Since the transverse partitions 32 engage the mounting blocks 17 of the splitter plates 14, the flow of material between an adjacent pair of splitter plates 14 is directed to a particular annulus of compartments 34. Since flow through conduits such as the inlet conduit 12 tends not to be uniform, the tiltable plate elements 18 of the splitter plates 14 can be pivoted about the pins 19 to provide equal flow to each channel and, thus, to each annulus of compartments 34. The rotor 16 is rotated continuously so that the compartments 34 of each trough receive a charge of material while they are aligned with the inlet conduit 12. The compartments 34 are then moved out of alignment with the inlet conduit 12 and toward the outlet 24. As this occurs, the vanes 26, with the help of the wipers 30, engage the internal surface of the drum 20 to seal the filled compartments 34 from the inlet conduit 12. As the compartments 34 register with the passages 36 in the outlet 24, they are facing downward, so that their contents tend to discharge under the force of gravity. In addition, in this position, the radial openings 46 in the gas supply pipe 44 register with the radial ports 42 of the downwardly facing compartments 34 so that the contents are blown out of the compartments into the outlet 24, which is especially helpful for material which tends to stick or cake. The engagement of the transverse partitions 32 with the webs 38 assures that the contents of each compartment 34 are discharged into its respective passage 36 and conveyor 40. In addition, the flow of air or other gas and entrained material along the troughs and among the various passages 36 is prevented, thereby eliminating the possibility of unequal amounts of material entering the different conveyors 40.

In an alternate embodiment of the invention illustrated in FIGS. 3 and 4, many of the elements are the same as those of the embodiment of FIGS. 1 and 2. A notable exception is the presence of a flexible member such as a flexible boot 48 in each of the compartments 34' of the rotor 16'. The flexible boots 48 are trough-shaped and conform generally to the shape of the compartments 34' in which they are mounted. The radially outer edges of each flexible boot 48 are spaced inwardly from the radially outer edges of the vanes 26' and the transverse partitions 32' defining the compartments 34' and are secured to the vanes and partitions by adhesives or other suitable means. Toward the bottom of the compartments 34', the walls of the flexible boots 48 diverge slightly from the vanes 26 and the transverse partitions 32, defining a gas-tight space 49 in order to permit the compressed air or gas to act on the outsides of the flexible boots 48 to flex the walls of the flexible boots 48 inwardly, thereby breaking up and expelling the material in the compartments 34'.

Other features of the alternate embodiment which are not shown in connection with the embodiment of FIGS. 1 and 2, are offset positions of the inlet conduit 12' and the outlet 24', and an agitator 50 (FIG. 4) positioned in the inlet conduit 12' to break up and distribute material before it enters the compartments 34' in the rotor 16'. In the illustrated alternate embodiment, splitter plates are not used. In addition, a generally cylindrical replaceable wear liner (not shown) can be inserted in the drum 20' to absorb the wear which results from the rotation of the partitions 26' and the wipers 30' in engagement with the inner surface of the drum 20'. A scraper 54 can be mounted in the inlet conduit 12' to remove any excess material from the edges of the partitions 26' and the wipers 30' before they engage the liner. Furthermore, plough edges 56 can be provided on the leading sides of the partitions 26' and a spring blade 58 can be provided in the outlet 24'. Moreover, suitable passages can be provided for lubrication and sealing air, as is known in the art.

Various suitable arrangements can be used to connect the rotor 16' to a prime mower, such as an electric motor, which is preferably of the variable speed type. FIG. 2 illustrates gear teeth 60 formed integrally with the hub 28 for connection to a gear train, and FIG. 3 shows a sprocket 62 keyed to the hub 28' for use in connection with a chain drive.

It can be appreciated that splitter plates may be employed with the embodiment of FIGS. 3 and 4 and that various other additions and modifications can be made without departing from the spirit and scope of the present invention.

We claim:

1. A rotary valve feeder for feeding material, comprising:
   a casing having an inlet and an outlet;
   a rotor mounted in the casing between the inlet and the outlet, the rotor including a plurality of vanes defining troughs and a plurality of partitions dividing each trough into a plurality of compartments;
   means for defining a plurality of passages in the outlet; and
   means in said inlet for defining a plurality of channels, said channel defining means being adjustable to vary the relative sizes of the channels with respect to one another in order to evenly divide the material among the compartments of the rotor.

2. The rotary valve feeder of claim 1 further comprising means in communication with each passage for conveying the material away from the outlet.

3. The rotary valve feeder of claim 1, wherein the passage defining means comprises a plurality of webs.

4. The rotary valve feeder of claim 2, wherein the conveying means comprises a plurality of conveyors, each conveyor being in communication with a passage in the outlet.

5. The rotary valve feeder of claim 1 wherein the compartments of the troughs are in circumferential alignment with one another, thereby defining a plurality of annuli of compartments, each annulus of compartments registering with a said passage.

6. The rotary valve feeder of claim 3 wherein the compartments of the troughs are in circumferential alignment with one another, thereby defining a plurality of annuli of compartments, each annulus of compartments registering with a said passage.

7. The rotary valve feeder of claim 1 wherein the partitions are in alignment with and in engagement with the passage defining means, thereby restricting the flow of material from each annulus of compartments to its respective passage.

8. The rotary valve feeder of claim 3 wherein the partitions are in alignment with and in engagement with the webs, thereby restricting the flow of material from each annulus of compartments to its respective passage.

9. The rotary valve feeder of claim 1 wherein the compartments of the troughs are in circumferential alignment with one another, thereby defining a plurality of annuli of compartments, each annulus of compartments being in communication with one of said channels.

10. The rotary valve feeder of claim 9 wherein the channel defining means comprises a plurality of splitter plates.

11. The rotary valve feeder of claim 10 wherein each splitter plate includes a pivotally mounted plate element.

12. The rotary valve feeder of claim 10 wherein the partitions are in alignment with the splitter plates.

13. The rotary valve feeder of claim 1 further includes means for assisting the discharge of material from the compartments.

14. The rotary valve feeder of claim 13 wherein the discharge assisting means includes a port in each compartment and a source of compressed gas in communication with the ports.

15. The rotary valve feeder of claim 14 wherein the discharge assisting means further includes a flexible member in each compartment, positioned between the port and the material, the flexible member defining with the compartment a gas space, whereby the compressed gas flexes the flexible member to assist the discharge of the material.

16. Apparatus for evenly distributing material across an area subject to pressure variations comprising:
   a casing having an inlet and an outlet;
   a plurality of conveyors in communication with said casing outlet and said area subject to pressure variations, each conveyor moving the material to a respective predetermined portion of said area;
   means for defining a plurality of passages in said casing outlet, each conveyor being in sealed communication with a respective one of said passages; and
   a rotor mounted in said casing between said inlet and said outlet, said rotor having an axis and a plurality of troughs parallel to said axis and registrable with more than one of said passages, said rotor further having means for dividing said troughs into a plurality of compartments, wherein each compartment is in registration with a respective one of said passages said trough dividing means being in sealing engagement with said means for defining a plurality of passages in said outlet in order to prevent the material from being blown along said troughs and between said compartments.

17. The apparatus according to claim 16, further comprising means in said inlet for defining a plurality of channels, said channel defining means being adjustable to vary the relative sizes of the channels with respect to one another in order to evenly divide the material among the compartments of the rotor.

* * * * *